United States Patent
Yoshioka et al.

(10) Patent No.: US 9,448,466 B2
(45) Date of Patent: Sep. 20, 2016

(54) DISPLAY DEVICE AND DRIVE METHOD FOR DISPLAY DEVICE

(71) Applicant: PIONEER CORPORATION, Kawasaki-shi, Kanagawa (JP)

(72) Inventors: Toshihiro Yoshioka, Kawasaki (JP); Haruhito Miyazaki, Kawasaki (JP)

(73) Assignee: PIONEER CORPORATION, Kawasaki-shi, Kanagawa (JP)

( * ) Notice: Subject to any disclaimer, the term of this patent is extended or adjusted under 35 U.S.C. 154(b) by 0 days.

(21) Appl. No.: 14/793,801

(22) Filed: Jul. 8, 2015

(65) Prior Publication Data

US 2015/0362772 A1 Dec. 17, 2015

Related U.S. Application Data

(63) Continuation of application No. 14/422,765, filed as application No. PCT/JP2012/071575 on Aug. 27, 2012.

(51) Int. Cl.
*G03B 21/60* (2014.01)
*G09G 3/36* (2006.01)

(52) U.S. Cl.
CPC .............. *G03B 21/60* (2013.01); *G09G 3/3611* (2013.01); *G09G 3/3614* (2013.01); *G09G 2310/067* (2013.01)

(58) Field of Classification Search
CPC ......... G03B 21/56; G03B 21/00; G09G 3/36
USPC ................................ 79/443; 359/449; 353/79
See application file for complete search history.

(56) References Cited

U.S. PATENT DOCUMENTS 5,075,789 A * 12/1991 Jones ..................... G09G 3/002
 348/E5.131
2008/0074565 A1 3/2008 Sagawa

FOREIGN PATENT DOCUMENTS

JP 2005-114869 * 10/1997 ........... G02F 1/1333
JP 9-258179 * 4/2005 ............. G03B 21/00
JP 4229161 B2 2/2009
JP 4490357 B2 6/2010

* cited by examiner

*Primary Examiner* — Christopher Mahoney
(74) *Attorney, Agent, or Firm* — Sughrue Mion, PLLC

(57) ABSTRACT

A display device having a simple circuit configuration and capable of lowering power consumption, and a drive method for the display device are provided. Rectangular wave voltage which changes between positive voltage V11 and 0 volt in cycle which is two times of cycle during which an optical state of an optical layer is changed is applied to an opposite electrode of a screen in a reverse mode. Pulse voltage which becomes a potential difference between electrodes of which optical state is changed when the optical state of the optical layer is changed is applied to a control electrode in a superimposed manner on rectangular wave voltage which changes between positive voltage V12 and 0 volt, which has the same cycle and the same phase as the rectangular wave voltage applied to the opposite electrode and which has the same value as V11.

16 Claims, 12 Drawing Sheets

FIG. 3A
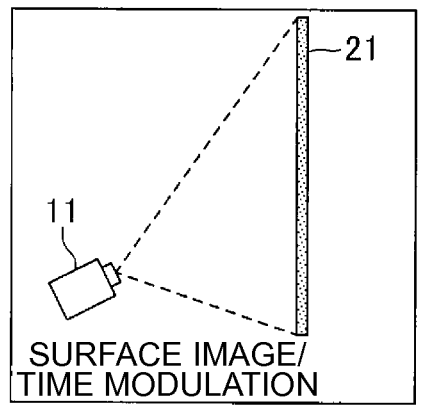
TIME MODULATION SCREEN
FIG. 3B
FIG. 3C
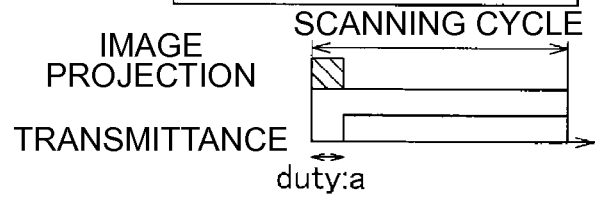
FIG. 4
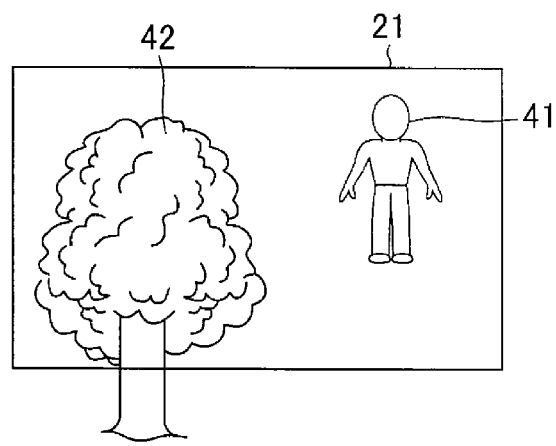

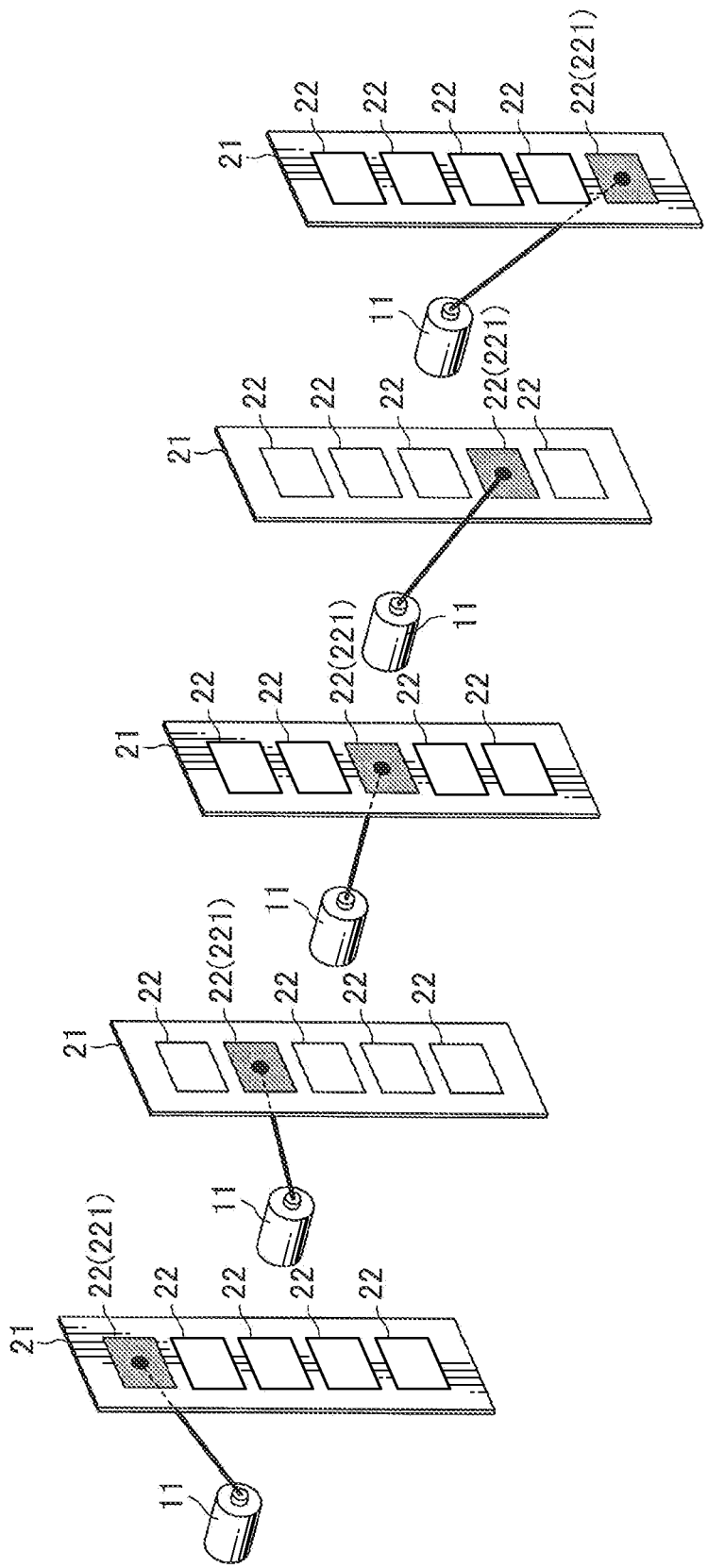

FIG. 17B IMAGE PROJECTION

FIG. 17C TRANSMITTANCE

DISPLAY DEVICE AND DRIVE METHOD FOR DISPLAY DEVICE

CROSS REFERENCE TO RELATED APPLICATIONS

This application is a continuation of U.S. application Ser. No. 14/422,765, filed Feb. 20, 2015, which is a National Stage of International Application No. PCT/JP2012/071575 filed Aug. 27, 2012, the contents of all of which are incorporated herein by reference in their entirety.

TECHNICAL FIELD

The present invention relates to a display device for displaying images and a drive method for the display device.

BACKGROUND ART

There is conventionally known a display device for projecting projection images from a light source such as a projector onto a screen (projection surface) to display images.

A liquid crystal element is used as a screen of the display device of this kind in some cases. Generally, if a liquid layer device (liquid crystal display) is DC driven, its life is shortened. Therefore, an AC voltage driving operation for driving the display is carried out by applying AC voltage. Examples of AC applying methods are a frame inverting drive method, a line-line inverting drive method, a row-line inverting drive method, and a dot inverting drive method (see Patent Literature 1 as example of screen using AC driving type liquid crystal).

Patent Literature 2 proposes that using a transmission type liquid crystal display panel as a screen, transmittance of the screen is controlled to alternately switch between a transparent state and an opaque state, a picture of a viewer is taken by a camera placed behind the screen when the state is the transparent state, and an image is displayed as a display when the state is the opaque state.

CITATION LIST

Patent Literatures

Patent Literature 1: JP 4229161 A
Patent Literature 2: JP 4490357 B1

SUMMARY OF INVENTION

Technical Problem

According to a transmission type liquid crystal display described in Patent Literature 2 also, an AC driving operation is carried out as the drive method. In the case of the AC driving operation, however, to enhance flexibility of timing when an optical state is changed, one of electrodes is fixed to 0 volt and bipolar AC voltage waveform is applied to the other electrode in some cases. In this case, two power sources of positive predetermined voltage +V and negative predetermined voltage −V are required, and there is a problem that power sources and a drive circuit become complicated. Further, since amplitude of drive voltage becomes large, there is a problem that power consumption becomes large.

Thereupon, to solve the above problems, in view of the above-described problems, it is an object of the present invention to provide a display device having a simple circuit structure and capable of reducing power consumption, and to provide a drive method of the display device.

Solution to Problems

To solve the above problems, one aspect of the present invention provides a display device including: a screen including an optical layer of which optical state is changed if voltage is applied to the optical layer, and a first electrode and a second electrode which are opposed to each other to sandwich the optical layer therebetween for applying voltage to the optical layer; and a controller which applies predetermined voltage to the first electrode and the second electrode during a projection period of image light projected onto the screen and which switches the screen between a predetermined image state for scattering image light and a non-image state which is a different optical state from the image state, wherein the controller applies, to the opposite electrode, first rectangular wave voltage having cycle which is integral multiple of cycle during which the optical state of the optical layer is changed, and applies, to the control electrode, second rectangular wave voltage having the same cycle as that of the first rectangular wave voltage and having the same phase as or a phase half-deviated from the first rectangular wave voltage and pulse voltage which becomes a potential difference between the electrodes of which the optical state is changed when the optical state of the optical layer is changed in a superimposed manner.

Another aspect of the present invention provides a drive method for a display device including: a screen including an optical layer of which optical state is changed if voltage is applied to the optical layer, and a first electrode and a second electrode which are opposed to each other to sandwich the optical layer there between for applying voltage to the optical layer; and a controller which applies predetermined voltage to the first electrode and the second electrode during a projection period of image light projected onto the screen and which switches the screen between a predetermined image state for scattering image light and a non-image state which is a different optical state from the image state, wherein the controller applies, to the first electrode, first rectangular wave voltage having cycle which is integral multiple of cycle during which the optical state of the optical layer is changed, and applies, to the second electrode, second rectangular wave voltage having the same cycle as that of the first rectangular wave voltage and having the same phase as or a phase half-deviated from the first rectangular wave voltage and pulse voltage which becomes a potential difference between the electrodes of which the optical state is changed when the optical state of the optical layer is changed in a superimposed manner.

BRIEF DESCRIPTION OF DRAWINGS

FIGS. 3A to 3C are explanatory diagrams of a projector which projects in synchronization with optical characteristics of the screen shown in FIG. 1.

FIG. 4 is an explanatory diagram of a display state where an image created by image light in the display device shown in FIG. 1 and a background of the screen overlap with each other.

FIGS. 16(A) to 16(E) are explanatory diagrams of synchronous control of scanning and driving operations of the screen shown in FIG. 14.

FIGS. 17(A) to 17(C) are explanatory diagrams of a projector which scans the screen shown in FIG. 14.

DESCRIPTION OF EMBODIMENTS

Figure 1:
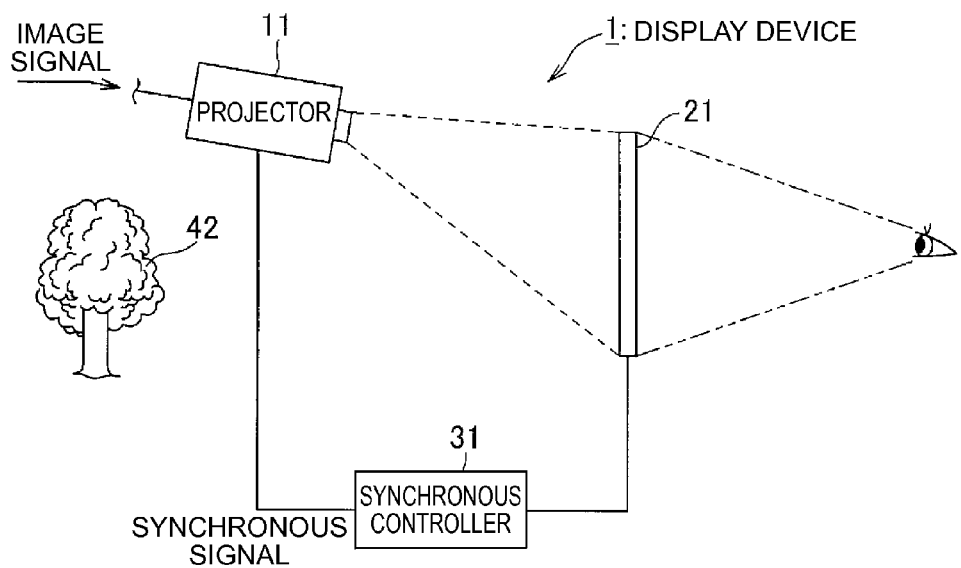
FIG. 1 is a schematic diagram showing a structure of a display device according to Example 1 of the present invention.

A display device according to an embodiment of the present invention will be described below. The display device according to the embodiment of the invention includes an optical layer having an optical state which changes if voltage is applied to the optical layer, and a screen having first and second electrodes opposed to each other to sandwich the optical layer therebetween such that voltage is applied to the optical layer. A controller is driven such that first rectangular wave voltage of cycle of an integral multiple of cycle which changes the optical state of the optical layer is applied to the first electrode of the screen, and such that pulse voltage which becomes a potential difference between the electrodes of which optical state is changed when the optical state of the optical layer is changed is applied to the second electrode in a superimposed manner on second rectangular wave voltage having the same cycle as that of the first rectangular wave voltage and having the same phase as or a phase half-deviated from the first rectangular wave voltage. Therefore, if the first and second rectangular wave voltages and amplitude of the pulse voltage are brought into such a potential difference between the electrodes that desired optical characteristics can be obtained, a circuit which is driven with small power source can be configured. Therefore, a circuit configuration can be simplified. Further, since it is possible to reduce voltage, power consumption can be reduced. Further, it is possible to easily change optical characteristics of a device which configures the optical layer with arbitrary timing.

The first rectangular wave voltage applied to the first electrode and the second rectangular wave voltage applied to the second electrode are composed of positive or negative voltage and voltage indicative of 0 volt. Amplitude of the second rectangular wave voltage applied to the second electrode may be the same as or smaller than that of the first rectangular wave voltage. According to this, the two rectangular wave voltages can be made as monopolar voltages. Therefore, amplitude of voltage applied to one electrode can be made small. If the amplitudes of the first and second rectangular wave voltages are set to such a potential difference between the electrodes that the optical state is changed, it is possible to configure a circuit which is driven by one power source. Hence, a circuit configuration can be simplified. If amplitude of the second rectangular wave voltage is made small, since the circuit can be driven with small voltage at timing other than timing when pulse voltage is applied. Therefore, it is possible to reduce the power consumption.

The first rectangular wave voltage applied to the first electrode and the second rectangular wave voltage applied to the second electrode are bipolar AC voltages, and the amplitude of the second rectangular wave voltage applied to the second electrode may be the same as or smaller than that of the first rectangular wave voltage. According to this, since the two rectangular wave voltages can be made as bipolar voltages, an absolute value of voltage applied to one electrode can be made small. When the amplitudes of the first rectangular wave voltage and the second rectangular wave voltage are the same, power source can be communalized. Hence, the circuit configuration can be simplified. When amplitude of the second rectangular wave voltage is small, even if the voltage is made as bipolar AC voltage, it is possible to produce a potential difference between the electrodes at which the optical state is changed while making the amplitudes of the first rectangular wave voltage and the second rectangular wave voltage smaller than that of a conventional technique. Therefore, power consumption can be reduced.

The first rectangular wave voltage applied to the first electrode is biased AC voltage, and the second rectangular wave voltage applied to the second electrode is composed of positive or negative voltage and voltage indicative of 0 volt. Amplitude of the second rectangular wave voltage applied to the second electrode is smaller than that of the first rectangular wave voltage, and a central value of the amplitude may be the same as that of the first rectangular wave voltage. According to this, even if the amplitude of the second electrode is made small by an amount corresponding to the biased first electrode, it is possible to produce a potential difference between the electrodes at which the optical state is changed. Hence, power consumption can be reduced.

Pulse voltage may be the same as at least one of the two voltage values configuring the second rectangular wave voltage. According to this, a power source producing the second rectangular wave voltage and a power source forming the pulse voltage can be communalized. Therefore, a configuration of a drive circuit can be simplified.

Pulse voltage may be the same as at least one of the two voltage values configuring the first rectangular wave voltage. According to this, a power source producing the first rectangular wave voltage and a power source forming the pulse voltage can be communalized. Therefore, a configuration of a drive circuit can be simplified.

Amplitude of the pulse voltage may be greater than that of the first rectangular wave voltage. According to this, even if the amplitude of the first rectangular wave voltage is made small, it is possible to produce a potential difference between the electrodes at which the optical state is changed. Hence, power consumption can be reduced.

In half cycle of the second rectangular wave voltage, the pulse voltage may be composed of a plurality of voltage values. According to this, transient characteristics of a device configuring an optical layer can be optimized by changing one pulse voltage in a stepwise fashion.

Cycle of the first rectangular wave voltage may be an even multiple of cycle which changes the optical state of the optical layer. According to this, it becomes easy to produce waveform of the first rectangular wave voltage from a synchronous signal of images, and the configuration of a drive circuit can be simplified.

The first rectangular wave voltage and the second rectangular wave voltage may be voltages at which device characteristics of a device configuring an optical layer are not changed by a potential difference generated by the two rectangular wave voltages, and may be voltage at which the same optical state as that when voltage is not applied is obtained. According to this, it is possible to reduce deterioration which is caused by deterioration with age of a device.

The second electrode may be divided into a plurality of regions, and application timing of pulse voltage may sequentially be switched such that timing when the controller changes the optical state of the optical layer corresponding to each of the regions of the divided second electrode is sequentially switched. According to this, in a screen in which the second electrode is divided into the plurality of regions, a configuration of a circuit can be simplified, and power consumption can be reduced.

The second electrode may be divided into a reed shape. According to this, it is possible to vertically arrange a screen along a scanning direction for example, and an optical state can sequentially be changed in a scanning order of images.

The controller may control such that application times of pulse voltage applied to a second electrode which is divided into a plurality of regions are different from each other in adjacent regions. According to this, after images are displayed, an optical state of a next region is stabilized, and it is possible to suppress display deterioration such as luminance unevenness.

Desired optical characteristics-maintaining time may be changed by increasing or reducing application time of pulse voltage which is applied to the second electrode by the controller. According to this, holding time of an optical state of each of the regions can freely be changed and it is possible to change a degree of clearness of a screen.

Of a plurality of second electrodes, if the controller detects a second electrode in which optical characteristics-maintaining time of an optical layer overlaps with voltage value-changing timing of the first rectangular wave voltage, the controller may perform control such that pulse voltage applied to the second electrode is changed to such a voltage value that a central value of the second rectangular wave voltage is inverted at voltage value-changing timing. According to this, of the plurality of regions, optical characteristics can be maintained for set time also in a region where the optical characteristics-maintaining time overlaps with the voltage value-changing timing of the first rectangular wave voltage, and it is possible to avoid a case where optical characteristics-maintaining times are different depending upon regions, and this deteriorates display such as display unevenness.

According to a drive method for a display device according to an embodiment of the present invention, a screen includes an optical layer having an optical state which is changed when voltage is applied, and a first electrode and a second electrode which are opposed to each other to sandwich the optical layer for applying voltage to the optical layer. First rectangular wave voltage of cycle of an integral multiple of cycle which changes the optical state of the optical layer is applied to the first electrode of the screen. Pulse voltage which becomes a potential difference between electrodes by which an optical state is changed when an optical state of the optical layer is changed is applied to the second electrode in a superimposed manner on second rectangular wave voltage having the same cycle as that of the first rectangular wave voltage and having the same phase as or a phase half-deviated from the first rectangular wave voltage. For example, amplitudes of the first and second rectangular wave voltages and pulse voltage are set to a potential difference between electrodes at which desired optical characteristics can be obtained, since a circuit driven by a small number of power sources (one power source) can be configured, a configuration of a circuit can be simplified. Further, since voltage can be lowered, power consumption can be reduced. It is possible to easily change optical characteristics of a device which configures an optical layer with arbitrary timing.

Example 1

A display device 1 according to Example 1 of the present invention will be described with reference to FIGS. 1 to 6. As shown in FIG. 1, the display device 1 includes a projector 11, a screen 21 and a synchronous controller 31. The display device 1 is a transmission type projection device which disperses image light of the projector 11 in a transmissive manner by the screen 21.

As the projector 11, it is possible to use a transmission type or reflection type liquid crystal light bulb which sequentially shifts a black state (state where projection light is not output) on the screen 21 during scanning cycle, but other device may also be used. The projector 11 may raster scan in scanning cycle of images, and dot-sequentially projects image light onto a display surface of the screen 21. As the projector 11, it is possible to use a laser projector which reflects and swings, by a movable mirror, an irradiation direction of optical beam of which intensity is modulated. It can be considered that this projector 11 sequentially scan an irradiation position of image light in one direction on the screen 21.

It is only necessary that the projector 11 can project, onto the screen 21, image light modulated by image information. The image information can be obtained from an image signal which is input to the projector 11. Examples of the image signal are an analogue format image signal such as an NTSC (National Television Standards Committee) method and a PAL (Phase Alternation by Line) method, and a digital format image signal such as an MPEG-TS (Moving Picture Experts Group-Transport Stream) method and an HDV (High-Definition Video) method. Not only a moving picture image signal, but also a still picture image signal such as JPEG (Joint Photographic Experts Group) may be input to the projector 11. In this case, it is only necessary that the projector 11 repeatedly scans the screen 21 by the same image light for displaying a still picture.

It is only necessary that the screen 21 can change an optical state by applying voltage. In the optical state of the screen 21, a scattering state is an image state and a clear transmission state where scattering of incident light is smaller than the image state and parallel light ray transmittance is high is a non-image state For example, liquid crystal material is used for the screen 21, and the screen 21 may be a light control screen which changes a scattering state and a clear transmission state where scattering of incident light is small. Examples of the light control screen are a screen using a liquid crystal device such as high molecular scattering liquid crystal, and a screen using a device which controls a scattering state and a clear transmission state where scattering of incident light is small by moving white powder in a clear cell.

Figure 2:
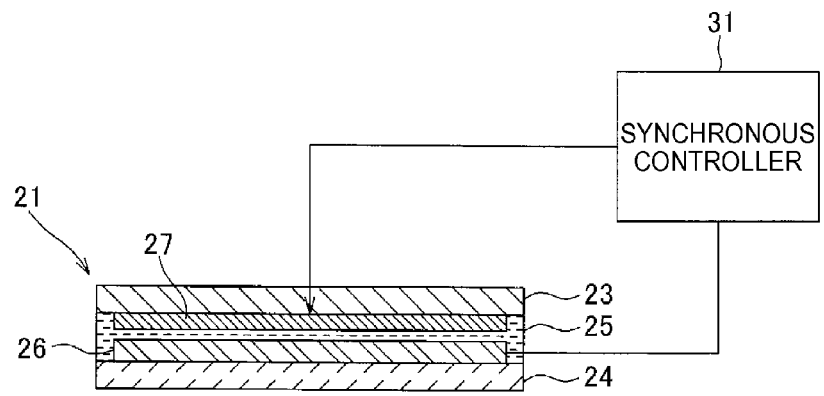
FIG. 2 is a schematic sectional view of a screen shown in FIG. 1.

FIG. 2 is a schematic sectional view of the screen 21 which can control an optical state. The screen 21 shown in FIG. 2 includes an optical layer 25 formed by sandwiching composite material including liquid crystal between a pair of clear glass plates 23 and 24. An opposite electrode 26 is formed on an entire surface of the glass plate 24 on the side of the optical layer 25. A control electrode 27 is placed on an entire surface of the glass plate 23 on the side of the optical layer 25. Intermediate layers made of insulative material may be formed between the electrodes 26 and 27 and the optical layer 25.

The opposite electrode 26 and the control electrode 27 are formed as clear electrodes from ITO (indium oxide, tin) for example. The optical layer 25 is placed between the control electrode 27 and the opposite electrode 26.

Voltage is applied to the screen 21 such that a potential difference is generated between the control electrode 27 and the opposite electrode 26. Drive waveform (drive voltage waveform) which will be described below shows waveform (voltage) applied to the control electrode 27 as a second electrode and to the opposite electrode 26 as a first electrode. An arrangement state of liquid crystal in the optical layer 25 is changed by voltage applied to the opposite electrode 26 and the control electrode 27.

The synchronous controller 31 as the controller performs control such that the screen 21 onto which images are projected is brought into a state where projected image light is scattered, and when image is not projected, the screen 21 is brought into a transmission state. As shown in FIG. 1, the synchronous controller 31 is connected to the projector 11 and the screen 21. The synchronous controller 31 controls an optical state of the screen 21 in synchronization with projection of image light of the projector 11. As a synchronization signal which is input to the synchronous controller 31 from the projector 11, it is possible to use a synchronization signal which is in synchronization with scanning cycle of the projector 11 for example.

Next, in the display device 1 of Example 1, a projecting method of the projector 11 which projects in synchronization with optical characteristics of the screen 21 will be described with reference to FIGS. 3A to 3C. FIGS. 3A to 3C are explanatory diagrams of a method in which the projector 11 projects image light at intervals. In this case, as shown in FIG. 3B, image light is projected onto the screen 21 during a portion of scanning cycle in a short term. As shown in FIG. 3C, it is only necessary that the screen 21 is brought into a scattering state in the portion of the period.

In a period other than the portion, if the optical state of the screen 21 is controlled such that parallel light ray transmittance of the screen 21 is increased, see-through characteristics of the screen 21 are obtained without lowering luminance of image in the scanning cycle. To obtain the same luminance, as compared with a case where image light is projected steadily, projection light of intensity of about reciprocal times of duty (duty: a in drawing) of time of the scattering state with respect to one scanning cycle is required. Therefore, to obtain high see-through characteristics, projection light output of strong pulse light emission is required.

By controlling the projector 11 and the screen 21 as described above, the screen 21 can scatter and transmit image light with the same brightness as that of the steady scattering state while keeping clearness through which an object existing on the back can be recognized. That is, it is possible to secure both see-through properties capable of recognizing a back object and high visibility of image.

Information of switching timing for synchronous control of the projector 11 and the screen 21 is sent to the synchronous controller 31 from the projector 11 as a synchronization signal. The projector 11 and the synchronous controller 31 may communicate with each other in a wireless manner using microwave or electromagnetic wave such as infrared light, and information for realizing synchronization may be sent and received through a wireless signal.

Under installation environment shown in FIG. 1 for example, it is possible to visually recognize an image on the display device 1 as shown in FIG. 4. FIG. 4 is an explanatory diagram of a display state where an image created by image light and a background of the screen 21 overlap with each other. In FIG. 4, an image of a person 41 created by image light is shown on the right side of the screen 21, and a tree 42 as a background existing on a far side of the screen 21 is shown on the left side of the screen 21.

Next, a driving operation of the display device 1 using the screen 21 which operates in a reverse mode will be described. In the case of the screen 21 which operates in the reverse mode, in a normal state where voltage is not applied, the screen 21 is in a clear transmission state. If voltage is applied, the screen 21 is brought into the scattering state of a scattering rate of parallel light ray corresponding to the applied voltage. According to the optical state of the screen 21, a predetermined scattering state corresponds to an image state, and a clear transmission state having parallel light ray transmittance higher than that of the image state corresponds to non-image state.

Figure 5:
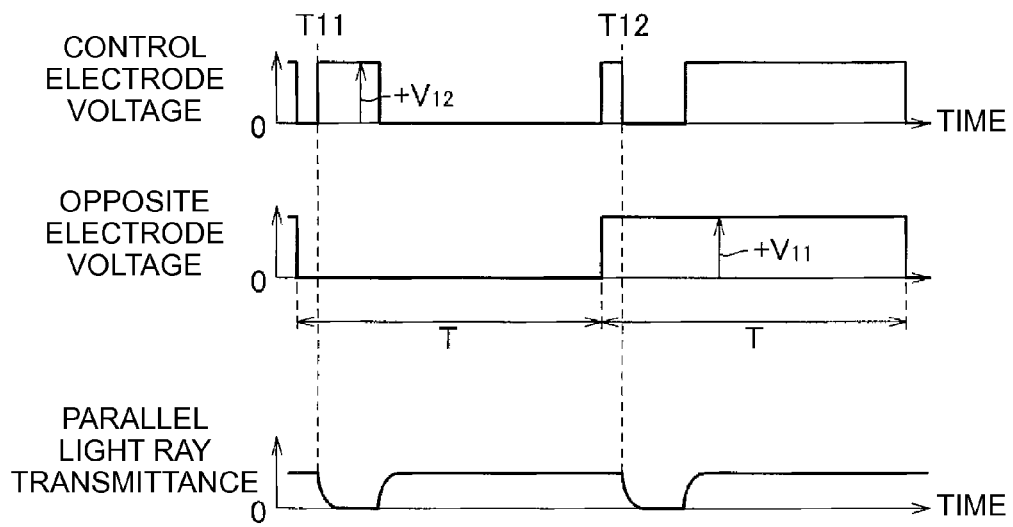
FIG. 5 is a timing chart showing driving voltage waveform when the screen shown in FIG. 1 operates in a reverse mode.

FIG. 5 is a timing chart showing one example of a relation between drive voltage waveform and an optical state where the synchronous controller 31 applies voltage to the screen 21 which is in the reverse mode of the embodiment. A lateral axis of the drive voltage waveform shows time, and a vertical axis shows voltage. The light ray transmittance is an optical state of the optical layer 25. A lateral axis of the light ray transmittance shows time, and a vertical axis shows transmittance of parallel light ray. If the parallel light ray transmittance is small, this means that scattering is strong.

In FIG. 5, rectangular wave voltage of cycle (2T) which is two times of repetition cycle (T) for changing device characteristics is applied to the opposite electrode 26 which is first rectangular wave voltage. This repetition cycle for changing the device characteristics is one frame period for example. The rectangular wave voltage applied to the opposite electrode 26 is controlled such that the rectangular wave voltage is changed between two voltages, i.e., between 0 volt and +V11 volts which is positive voltage. The cycle of rectangular wave voltage which is applied to the opposite electrode 26 is not limited to two time of repetition cycle for changing device characteristics, but it is preferable that the cycle is an even multiple of the repetition cycle, such as four times.

On the other hand, pulse voltage is applied to the second electrode which is the second rectangular wave voltage in a superimposed manner on rectangular wave voltage having the same cycle and the same phase as those of the opposite electrode 26 (voltages are changed at the same timing) when the optical state is changed. That is, when (T11, T12 in FIG. 5) the optical state is changed, a potential difference between the electrodes, i.e., between the opposite electrode 26 and the control electrode 27 is increased up to a potential difference for changing the optical state of the optical layer 25 (changing from the transmission state to the scattering state). In FIG. 5, the transmission state is changed to the scattering state at T11 and T12. That is, during application time of pulse voltage from this timing, a region corresponding to the control electrode 27 becomes the image state and the image is projected.

The rectangular wave voltage and pulse voltage applied to the control electrode 27 are controlled such that they change between two voltages, i.e., 0 volt and +V12 volts which are positive voltage. That is, with T11, pulse voltage of +V12 volts is applied, and with T12, pulse voltage which is held at 0 volt is applied. Therefore, the pulse voltage is the same as the two voltage values (+V12, 0) of the rectangular wave voltages applied to the control electrode 27.

It is preferable that amplitudes V11 and V12 of the drive voltage waveforms applied to the opposite electrode 26 and the control electrode 27 match with each other (V11=V12) so that AC bias component is not applied to a device which configures the optical layer 25, but even if the amplitudes V11 and V12 are different from each other, they may appropriately be set based on a potential difference capable of maintaining the transmission state and based on a potential difference which becomes a scattering state within a range not influencing device characteristics configuring the optical layer 25. For example, amplitude of rectangular wave voltage applied to the control electrode 27 may be made smaller than rectangular wave voltage applied to the opposite electrode, and voltage which becomes a potential difference capable of changing the optical state may be applied as pulse voltage.

In FIG. 5, pulse voltage is applied to the control electrode 27 once during one frame period (repetition cycle for changing device characteristics), but the pulse voltage may be applied two times or more, and the pulse voltage may be changed in a plurality of scattering states during one frame period. In also Example 2 and subsequent Examples which will be described later, pulse voltage may be applied to the repetition cycle which changes device characteristics a plurality of times of course.

According to Example 1, the synchronous controller 31 performs control such that rectangular wave voltage which changes between positive voltage V11 and 0 volt in cycle which is two times of cycle for changing an optical state of the optical layer is applied to the opposite electrode 26 of the screen 21 which operates in the reverse mode, and pulse voltage which becomes a potential difference between electrodes and of which optical state is changed when the optical state of the optical layer 25 is changed is applied to the control electrode 27 in the superimposed manner on rectangular wave voltage which changes between 0 volt and positive voltage V12 having the same cycle and the same phase as those of the rectangular wave voltage applied to the opposite electrode 26 and having the same value as V11. Therefore, if the two rectangular wave voltages and the amplitudes V11 and V12 of the pulse voltage are set to a potential difference between electrodes having the same values and capable of obtaining desired optical characteristics, a circuit for driving using one power source can be configured. Therefore, a circuit configuration can be simplified. Since a voltage value to be applied can be lowered, power consumption can be reduced.

Further, since the rectangular wave voltages are applied, the AC driving operation is carried out substantially. Since the two rectangular wave voltages can be made as monopolar voltages, amplitude of voltage applied to one electrode can be made small. Cycle of the rectangular wave voltage is two times, i.e., an even multiple of cycle which changes the optical state of the optical layer 25. Hence, waveform of the rectangular wave voltage can easily be produced from a synchronization signal or the like of image. That is, if rectangular wave voltage of the opposite electrode 26 is synchronized with frame cycle of the projector 11, a flexibility degree of modulation timing to change into a scattering state is enhanced by waveform of the control electrode 27 including its time width. Therefore, it is possible to easily change optical characteristics of a device which configures the optical layer 25 with any timing.

Since pulse voltage has the same value as one (+V12) of the two voltage values (+V12, 0) configuring rectangular wave voltages applied to the control electrode 27, the number of power sources which produce voltage to be applied to the control electrode 27 can be made one, and a circuit configuration can be simplified.

Although voltages applied to the opposite electrode 26 and the control electrode 27 are 0 volt and positive voltage in Example 1, the voltages may be 0 volt and negative voltage. Although pulse voltage has the same value as one of the two voltage values which configure rectangular wave voltage applied to the control electrode 27, the pulse voltage may have the same value as one of the two voltage values (+V11, 0) which configure rectangular wave voltage applied to the opposite electrode 26.

Figure 6:
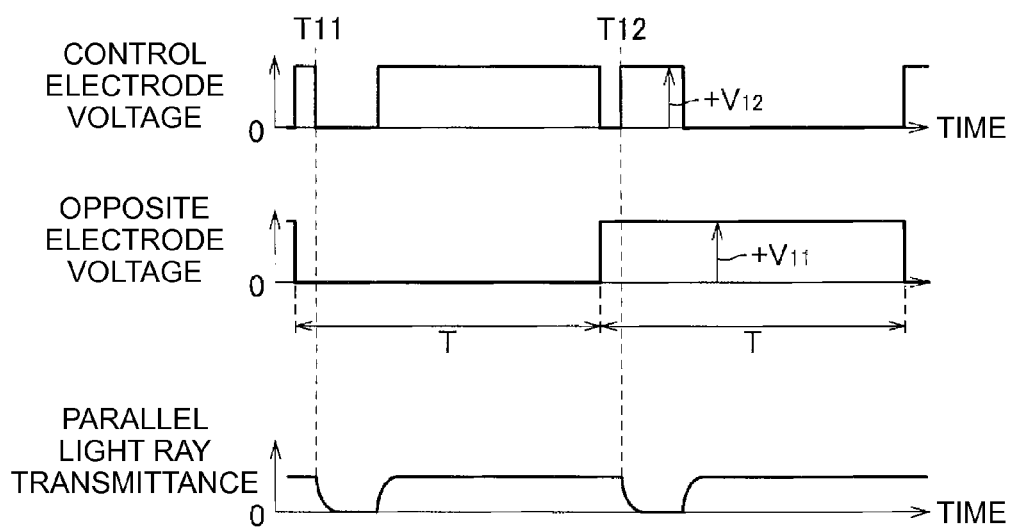
FIG. 6 is a timing chart showing driving voltage waveform when the screen shown in FIG. 1 operates in a normal mode.

Although the screen 21 which operates in the reverse mode is described in Example 1, the screen 21 may be operated in a normal mode as shown in FIG. 6. In the screen 21 which operates in the normal mode, in a normal state where voltage is not applied, the screen 21 is brought into a scattering state. If voltage is applied, the screen 21 is brought into a clear transmission state having parallel light ray transmittance corresponding to the applied voltage.

In the case of the normal mode, as indicated in a timing chart shown in FIG. 6, rectangular wave voltage of cycle which is two times of cycle for changing the optical state of the optical layer 25 is applied to the opposite electrode 26, and pulse voltage is applied to the control electrode 27 in a superimposed manner on rectangular wave voltage having the same cycle as that of the opposite electrode 26 and having phase opposite from (cycle is deviated by half) that of the opposite electrode 26 when the optical state is changed (T11, T12). That is, a potential difference between electrodes, i.e., the opposite electrode 26 and the control electrode 27 is reduced to a potential difference in which the optical state of the optical layer 25 is changed (changed from transmission state to scattering state) when the optical state is changed (T11, T12 in FIG. 6). Here, V11 and V12 in FIG. 6 have a relation V1=V2 like V11 and V12 shown in FIG. 6.

Example 2

Next, a display device according to Example 2 of the present invention will be described with reference to FIGS.

7 and 8. The same reference signs are allocated to the same members as those of Example 1, and description thereof will be omitted.

A configuration of the display device of Example 2 is the same as that of Example 1, but drive voltage waveforms applied to the opposite electrode 26 and the control electrode 27 are different. Example 2 will be described with reference to a timing chart which shows one example of drive voltage waveform of Example 2 shown in FIG. 7.

Figure 7:
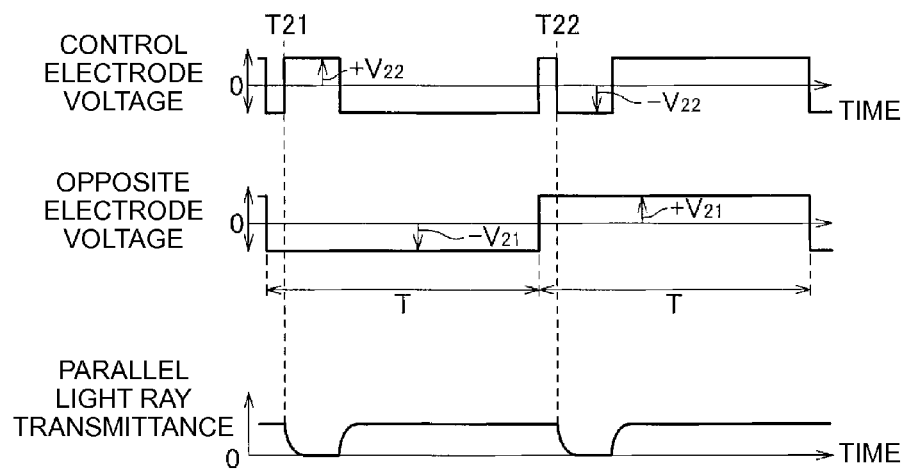
FIG. 7 is a timing chart showing driving voltage waveform when a screen of a display device according to Example 2 of the invention operates in a reverse mode.

FIG. 7 shows an example of the screen 21 which operates in the reverse mode. In FIG. 7, rectangular wave voltage of cycle (2T) which is two times of repetition cycle (T) for changing device characteristics is applied to the opposite electrode 26 which is first rectangular wave voltage. The rectangular wave voltage applied to the opposite electrode 26 changes between +V21 volts and −V21 volts with 0 volt as a center thereof.

Pulse voltage is applied to the control electrode 27 in a superimposed manner on rectangular wave AC voltage having the same cycle and the same phase as those of the opposite electrode 26 which is the second rectangular wave voltage when the optical state is changed. The rectangular AC voltage applied to the control electrode 27 changes between +V22 volts and −V22 volts with 0 volt as a center thereof, and voltage of −V22 volts or +V22 volts is applied to pulse voltage. That is, Example 2 is different from Example 1 in that drive voltage waveforms applied to the opposite electrode 26 and the control electrode 27 are bipolar AC voltages.

A potential difference between electrodes, i.e., the opposite electrode 26 and the control electrode 27 is increased to a potential difference at which the optical state of the optical layer 25 is changed when the optical state is changed (T21, T22 in FIG. 7).

In Example 2, rectangular wave voltage applied to the opposite electrode 26 is bipolar AC voltage, and amplitude of the rectangular wave voltage applied to the opposite electrode 26 is the same as rectangular wave voltage applied to the control electrode 27 (V21=V22). Therefore, voltages applied to the opposite electrode 26 and the control electrode 27 are substantially half of Example 1, and it is possible to change optical characteristics of a device with arbitrary timing with small voltage.

According to Example 2, the rectangular wave voltage applied to the opposite electrode 26 is bipolar AC voltage, and amplitude of rectangular wave voltage applied to the control electrode 27 is the same as the rectangular wave voltage applied to the opposite electrode 26, and central values of amplitude are the same (0 volt). Therefore, even if bipolar AC voltage is employed, an absolute value of the rectangular wave voltage (value from 0 volt to two voltage values forming rectangular wave) can be made smaller than that of the conventional technique, and a potential difference between the electrodes by an optical state is changed can be produced. Therefore, power consumption can be reduced.

Figure 8:
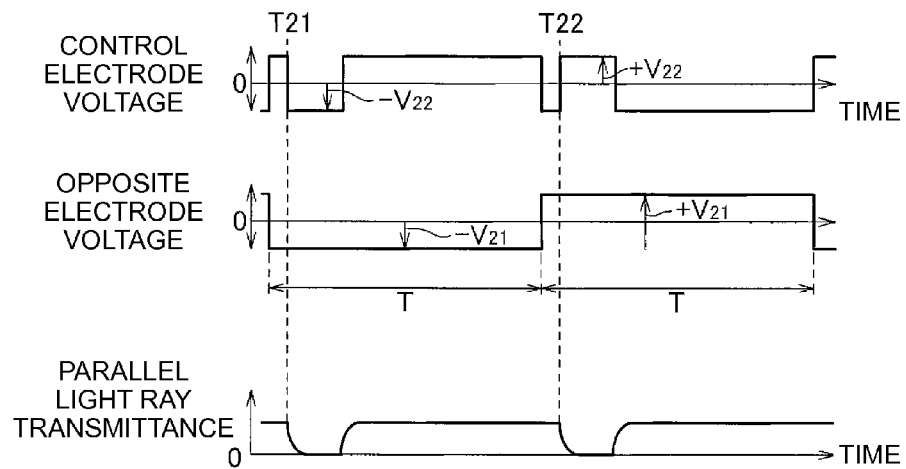
FIG. 8 is a timing chart showing driving voltage waveform when the screen shown in FIG. 7 operates in a normal mode.

Although the screen 21 which operates in the reverse mode is described in Example 2, the screen 21 may be operated in a normal mode as shown in FIG. 8. In the case of the normal mode, as indicated in a timing chart shown in FIG. 8, rectangular wave AC voltage of cycle which is two times of cycle for changing the optical state of the optical layer 25 is applied to the opposite electrode 26, and pulse voltage is applied to the control electrode 27 in a superimposed manner on rectangular wave AC voltage having the same cycle as that of the opposite electrode 26 and having phase opposite from that of the opposite electrode 26 when the optical state is changed (T21, T22). A potential difference between electrodes, i.e., the opposite electrode 26 and the control electrode 27 is reduced to a potential difference in which the optical state of the optical layer 25 is changed when the optical state is changed (T21, T22 in FIG. 8). Here, V21 and V22 in FIG. 8 have a relation V21=V22 like V21 and V22 shown in FIG. 7.

Example 3

Next, a display device according to Example 3 of the present invention will be described with reference to FIG. 9. The same reference signs are allocated to the same members as those of Examples 1 and 2, and description thereof will be omitted.

A configuration of the display device of Example 3 is the same as that of Example 1, but drive voltage waveforms applied to the opposite electrode 26 and the control electrode 27 are different. Example 3 will be described with reference to a timing chart which shows one example of drive voltage waveform of Example 3 shown in FIG. 9.

Figure 9:
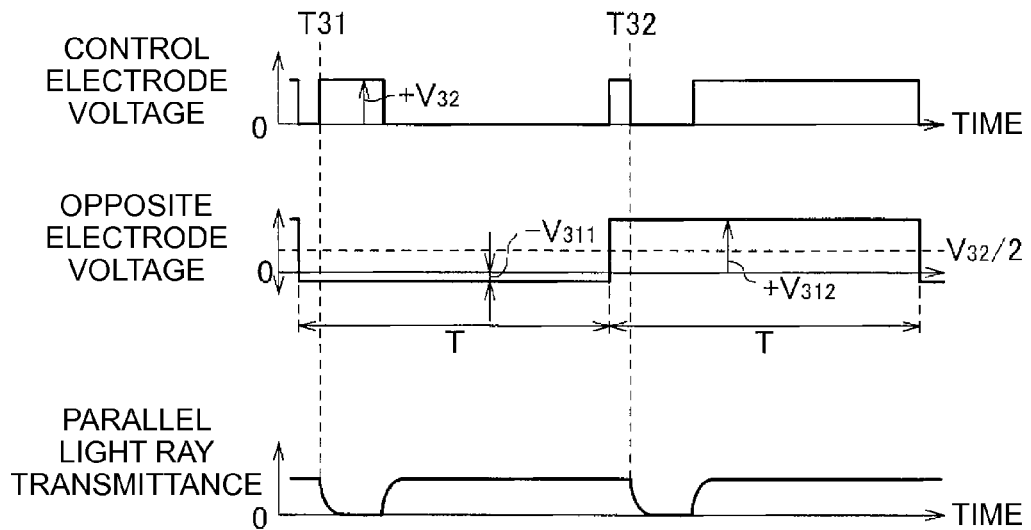
FIG. 9 is a timing chart showing driving voltage waveform when a screen of a display device according to Example 3 of the invention operates in a reverse mode.

FIG. 9 shows an example of the screen 21 which operates in the reverse mode, but the present invention can be applied also to the normal mode in the same manner. In FIG. 9, rectangular wave voltage of cycle (2T) which is two times of repetition cycle (T) for changing device characteristics is applied to the opposite electrode 26 which is first rectangular wave voltage. The rectangular wave voltage applied to the opposite electrode 26 is biased of an amount corresponding the negative voltage of −V311 volts. That is, this is biased AC voltage. Further, positive voltage +V312 of rectangular wave voltage is greater than rectangular wave voltage of the later-described control electrode 27 and amplitude V32 of the pulse voltage by V311 volts.

Pulse voltage is applied to control electrode 27 in a superimposed manner on rectangular wave voltage having the same cycle and the same phase as those of the opposite electrode 26 which is second rectangular wave voltage when an optical state is changed. Rectangular wave voltage applied to the control electrode 27 is controlled such that it changes between two voltages, i.e., 0 volt and +V32 volts which is positive vole. A central value of amplitude of the control electrode 27 and a central value of amplitude of the opposite electrode 26 are the same (V32/2). That is, Example 3 is different from Example 1 in that rectangular wave voltage applied to the opposite electrode 26 is AC voltage, amplitude of rectangular wave voltage applied to the control electrode 27 is smaller than that of rectangular wave voltage applied to the opposite electrode, and both the central values are the same.

When the optical state is changed (T31, T32 in FIG. 9), a potential difference between the electrodes, i.e., the opposite electrode 26 and the control electrode 27 is increased to a potential difference at which the optical state of the optical layer 25 is changed. That is, an optical state is changed from V32 to −V311 at T31 by a potential difference, and an optical state is changed from +V312 to 0 volt at T32 by a potential difference.

Although FIG. 9 shows AC voltage in which negative volt is biased, positive voltage may be biased in the AC voltage. In this case, polarity of waveform in FIG. 9 is reversed, and negative voltage is applied to the control electrode 27.

According to Example 3, since the opposite electrode 26 is biased of negative voltage of −V311, it is possible to reduce rectangular wave voltage applied to the control electrode 27 and pulse voltage by the biased voltage, cost of a control electrode drive circuit can be reduced, and power consumption can be reduced. These effects are large especially when the later-described control electrode 27 is divided and it is scanned and driven.

Example 4

Next, a display device according to Example 4 of the present invention will be described with reference to FIGS. 10 to 12. The same reference signs are allocated to the same members as those of Examples 1 to 3, and description thereof will be omitted.

A configuration of the display device of Example 4 is the same as that of Example 1, but drive voltage waveforms applied to the opposite electrode 26 and the control electrode 27 are different. Example 4 will be described with reference to a timing chart which shows one example of drive voltage waveform of Example 4 shown in FIG. 10.

Figure 10:
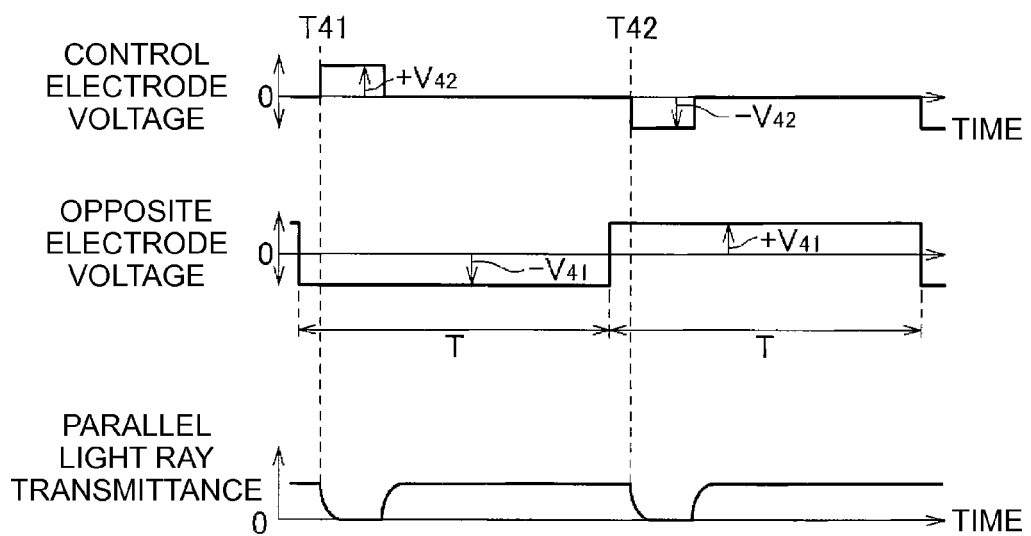
FIG. 10 is a timing chart showing driving voltage waveform when a screen of a display device according to Example 4 of the invention operates in a reverse mode.
Figure 11:
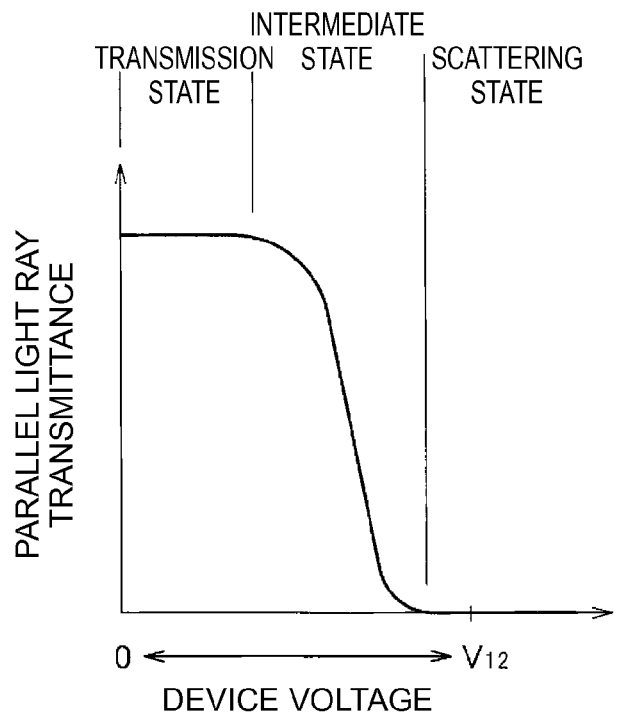
FIG. 11 is a graph showing a relation between device voltage of an optical layer of drive voltage waveform shown in FIG. 5 and parallel light ray transmittance.

FIG. 10 shows an example of the screen 21 which operates in the reverse mode, but the present invention can be applied also to the normal mode in the same manner. In FIG. 10, rectangular wave voltage of cycle (2T) which is two times of repetition cycle (T) for changing device characteristics is applied to the opposite electrode 26 which is first rectangular wave voltage. The rectangular wave voltage applied to the opposite electrode 26 changes between +V41 volts and −V41 volts with 0 volt as a center thereof.

Pulse voltage is applied to the control electrode 27 in a superimposed manner on rectangular wave voltage having the same cycle and the same phase as those of the opposite electrode 26 which is second rectangular wave voltage when an optical state is changed. Since amplitude of rectangular AC voltage applied to the control electrode 27 is 0, 0 volt DC is substantially applied to the control electrode 27. Voltage of −V42 volts or +V42 volts is applied to the pulse voltage. That is, Example 4 is different from Example 1 in that rectangular wave voltage applied to the opposite electrode 26 is bipolar AC voltage, and rectangular wave voltage applied to the control electrode 27 has 0 (zero) amplitude and central values of both the amplitudes are the same.

When an optical state is changed (T41, T42 in FIG. 10), a potential difference between electrodes, i.e., the opposite electrode 26 and the control electrode 27 is increased to a potential difference at which the optical state of the optical layer 25 is changed.

According to Example 4, rectangular wave voltage applied to the opposite electrode 26 is bipolar AC voltage, and pulse voltage is applied to rectangular wave AC voltage of amplitude 0 of the control electrode 27 when the optical state of the optical layer 25 is changed. Therefore, a potential difference between electrodes in which an optical state is changed with small amplitude can be stably produced in the control electrode 27 only when the potential difference is necessary and thus, power consumption can be reduced.

In the case of Example 4, amplitude of rectangular wave voltage applied to the control electrode 27 may not be 0, and this amplitude may be smaller than that of rectangular wave AC voltage applied to the opposite electrode 26. In this case also, if amplitude of only pulse voltage is set to a necessary value, an optical state of the optical layer 25 can be changed.

In the case of Example 4, as the device of the optical layer 25, it is possible to use a device in which a relation between voltage change and parallel light ray transmittance is abruptly changed when the device is changed between a transmission state and a scattering state. The relation between the voltage change and the parallel light ray transmittance will be described with reference to FIGS. 11 and 12. FIG. 11 is a graph showing the relation between voltage change of drive voltage waveform shown in Example 1 (FIG. 5) and parallel light ray transmittance. FIG. 12 is a graph showing the relation between voltage change in drive voltage waveform shown in Example 4 (FIG. 10) and parallel light ray transmittance.

In the case of drive voltage waveform shown in FIG. 5, it is necessary to change between the transmission state of device voltage 0 volt and the scattering state of V12 volts. At this time, the state is changed from the transmission state to the scattering state through an intermediate state where the parallel light ray transmittance is changed. Therefore, if a length (inclination) of the intermediate state large, it is necessary to also increase the voltage to be changed.

Figure 12:
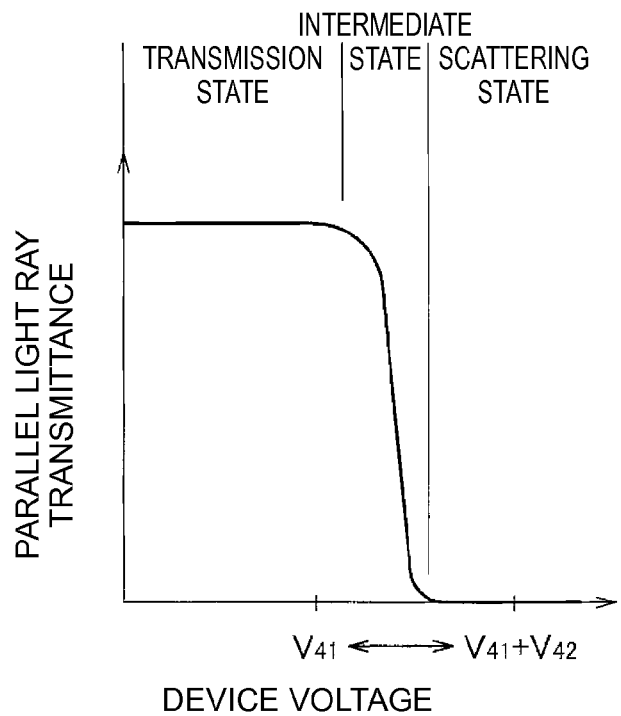
FIG. 12 is a graph showing a relation between device voltage of an optical layer of drive voltage waveform shown in FIG. 10 and parallel light ray transmittance.

Hence, if a device having a short length (inclination is abrupt) of the intermediate state is used, it is possible to increase device voltage in the transmission state to V41 volts as shown in FIG. 12, and it is possible to reduce pulse voltage V42 applied to the control electrode 27 which is necessary to change voltage up to voltage (V41+V42) in the scattering state.

If drive voltage is applied as shown in FIG. 12, +V41 or −V41 voltage is applied to a device which configures the optical layer 25 except at application timing of pulse voltage, but it is preferable that this voltage is of such a level that the device is not deteriorated by deterioration with age of optical characteristics of the device. That is, this voltage is of such a level that device characteristics of the device which configures the optical layer 25 is not changed by a potential difference caused by two rectangular wave voltages (this voltage is of such a level that device characteristics of device configuring optical layer 25 is not changed and optical state is the same as state when voltage is not applied). This deterioration means that a length in the intermediate state is increased (inclination is large) during usage, and that voltage which becomes a transmission state is reduced.

Example 5

Next, a display device according to Example 5 of the present invention will be described with reference to FIG. 13. The same reference signs are allocated to the same members as those of Examples 1 to 4, and description thereof will be omitted.

A configuration of the display device of Example 5 is the same as that of Example 1, but drive voltage waveforms applied to the opposite electrode 26 and the control electrode 27 are different. Example 5 will be described with reference to a timing chart which shows one example of drive voltage waveform of Example 5 shown in FIG. 13.

Figure 13:
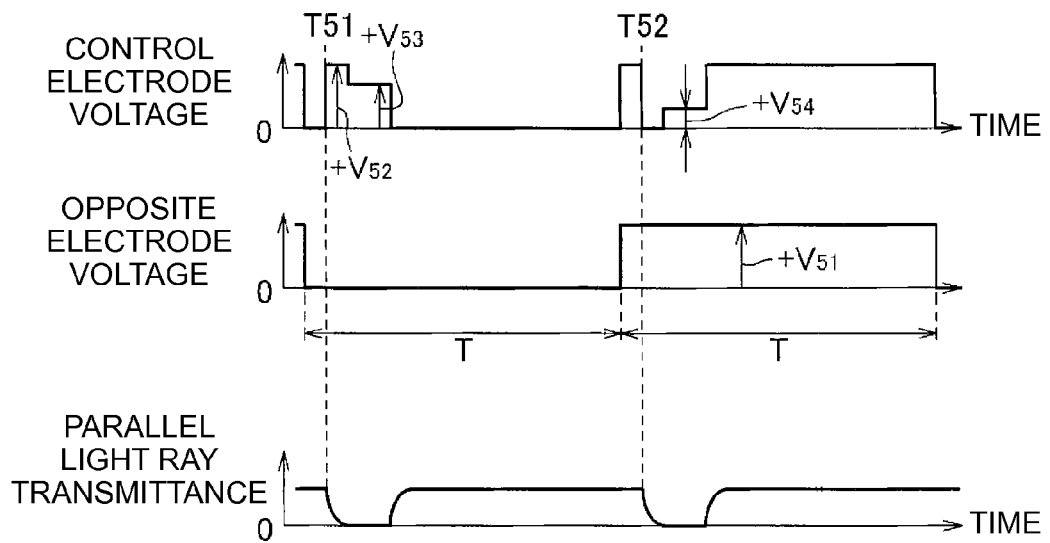
FIG. 13 is a timing chart showing driving voltage waveform when a screen of a display device according to Example 5 of the invention operates in a reverse mode.

FIG. 13 shows an example of the screen 21 which operates in the reverse mode, but the present invention can be applied also to the normal mode in the same manner. In FIG. 13, rectangular wave voltage of cycle (2T) which is two times of repetition cycle (T) for changing device characteristics is applied to the opposite electrode 26 which is first rectangular wave voltage. The rectangular wave voltage applied to the opposite electrode 26 is controlled such that it changes between two voltages, i.e., 0 volt and +V51 volts as in Example 1.

Pulse voltage is applied to the second electrode in a superimposed manner on rectangular wave voltage having the same cycle and the same phase as those of the opposite electrode 26 which is second rectangular wave voltage when an optical state is changed. Pulse voltage applied to T51 in FIG. 13 is composed of two voltages, i.e., +V52 volts and +V53 volts. First, +V52 volts are applied and if predetermined time is elapsed, +V53 volts are applied. That is, in half cycle of rectangular wave voltage during which pulse voltage is applied to the control electrode 27, the pulse voltage is composed of a plurality of voltage values. These voltages have a relation of V52>V53, and V53 is voltage capable of maintaining a scattering state. The pulse voltage applied to T52 in FIG. 13 has waveform created because a voltage value of rectangular wave voltage applied to the control electrode 27 is changed, and the pulse voltage is composed of two voltages, i.e., 0 volt and +V54 volts. First, 0 volt is applied and after predetermined time is elapsed, +V54 volts are applied. Since a voltage value of rectangular wave voltage applied to the control electrode 27 is changed as described above, pulse voltage applied to T51 and pulse voltage applied to T52 have a relation V52−V53=V54.

When an optical state is changed (T51, T52 in FIG. 13), a potential difference between electrodes, i.e., the opposite electrode 26 and the control electrode 27 is increased to a potential difference by which the optical state of the optical layer 25 is changed.

As shown in especially FIG. 13, large voltage (V52) is first applied and then, lower voltage (V53) is applied. According to this, response time is made higher and a state can be stabilized into an appropriate scattering state.

Voltages configuring pulse voltage are not limited to two and may be composed of three or more voltage values, a combination of a plurality of voltages is not limited to a fact that the voltages are changed in descending order, and the combination may appropriately be changed in accordance with characteristics to be changed.

According to Example 5, since pulse voltage applied to the control electrode 27 is composed of the plurality of voltage values, if one pulse voltage is changed in a stepwise fashion, transient characteristics of the device configuring the optical layer 25 can be optimized.

Example 6

Next, a display device according to Example 6 of the present invention will be described with reference to FIGS. 14 to 19. The same reference signs are allocated to the same members as those of Examples 1 to 5, and description thereof will be omitted.

According to the display device of Example 6, a screen 21 is divided into a plurality of regions, and the regions (divided regions) can be switched, at respectively independent timings, between a scattering state and a clear transient state in which a scattering degree of incident light is small.

Figure 14:
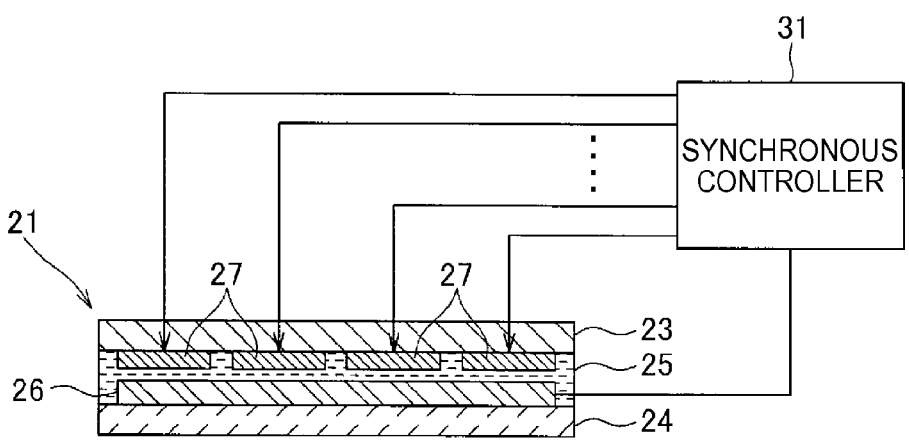
FIG. 14 is a schematic sectional view of a screen according to Example 6 of the invention.
Figure 15:
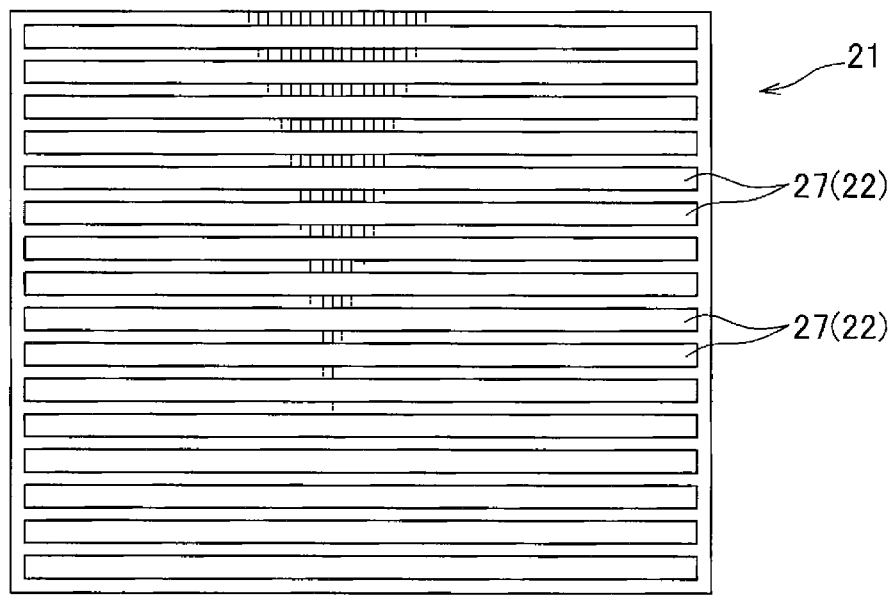
FIG. 15 is a schematic front view of a screen showing positions of a plurality of control electrodes shown in FIG. 14.

FIG. 14 is a schematic sectional view of the screen 21 in which an optical state of each of the divided regions can be controlled. FIG. 15 is a schematic front view of the screen showing arrangement of a plurality of control electrodes in the screen 21 shown in FIG. 14. The screen 21 shown in FIG. 14 includes an optical layer 25 formed by sandwiching composite material including liquid crystal between a pair of clear glass plates 23 and 24. An opposite electrode 26 is formed on an entire surface of the glass plate 24 on the side of the optical layer 25. A plurality of control electrodes 27 are placed on the glass plate 23 on the side of the optical layer 25. Intermediate layers made of insulative material may be formed between the electrodes 26 and 27 and the optical layer 25.

The plurality of control electrodes 27 divide regions of the screen 21 irradiated with image light into a reed shape (see FIG. 15) in one direction (scanning direction for example). The plurality of control electrodes 27 are individually connected to a synchronous controller 31, and voltages can individually be applied to the control electrodes 27. Adjacent control electrodes 27 are arranged at distance from each other. Although the reed shape regions are arranged vertically in FIG. 15, the regions may be divided also in the lateral direction, and the regions may be divided in a matrix shape.

The optical layer 25 of Example 6 can be adjusted between a clear transient state having small scattering degree of incident light and a scattering state in which incident light is scattered in each of the divided regions.

A width of a gap region in the optical layer 25 corresponding to a region where the control electrode 27 is not formed between the control electrodes 27 is about 5 to 100 micrometers, and it is preferable that the width is reduced as narrow as possible. A thickness of the optical layer 25 is several to several dozen micrometers, and the thickness is determined while taking the optical characteristics and drive voltage into account.

A basic operation principle of the display device 1 having the above-described configuration will be described. FIGS. 16A to 16E are explanatory diagrams of synchronous control of a scanning operation and a driving operation of the screen 21. The projector 11 vertically scans the screen 21 from top to bottom by image light which is modulated by image information. The projector 11 vertically scans the screen 21 from top to bottom every repetition cycle of scanning (scanning cycle, hereinafter).

FIGS. 16A to 16E show a scanning state at each of time points during one scanning cycle in scanning order. The screen 21 in FIGS. 16A to 16E has five divided regions 22. The five divided regions 22 are arranged vertically along the scanning direction of the image light.

The synchronous controller 31 individually controls the optical states of the five divided regions 22 in synchronization with a scanning operation of the projector 11 in one dimensional vertical direction of the screen 21. When the image light is not projected, each of the divided regions 22 is controlled into a non-image state, i.e., a clear transient state having small scattering degree of incident light.

If the scanning operation of image light is started, the uppermost divided region 22 of the screen 21 is first irradiated with scanning light of the projector 11 as shown in FIG. 16A. In the following description, to distinguish a divided region 22 irradiated with scanning light from other divided regions 22 which are not scanned, a reference sign 221 is used. The synchronous controller 31 specifies a period during which the uppermost divided region 221 is scanned during the scanning cycle based on a synchronous signal from the projector, and the uppermost divided region 221 is controlled into the image state. The image light scanning the uppermost divided region 221 is scattered by the divided region 221 which is in the scattering state, and the image light penetrates the screen 21.

Next, the scanning operation of image light moves from a second top divided region 221 of the screen 21 as shown in FIG. 16B. The synchronous controller 31 specifies a period during which the second top divided region 221 is scanned during the scanning cycle, and controls the second top divided region 221 into the image state. The image light which scans the second top divided region 221 is scattered by a divided region 221 which is in a scattering state, and the image light penetrates the screen 21. After the synchronous controller 31 controls the second top divided region 221 into the image state, the synchronous controller 31 controls the uppermost divided region 22 into a non-image state. Thereafter also, as shown in FIGS. 16C to 16E, the synchronous controller 31 controls a divided region 221 which is scanned by scanning light into the image state, and controls other divided regions 22 into the non-image state.

According to the above-described synchronous control, a portion of the screen 21 which is irradiated with scanning light is maintained in the image state. According to this, the image light which scans the screen 21 is scattered by the screen 21 which is in the scattering state. A portion of the screen 21 which is not irradiated with scanning light is controlled into a non-image state. In most of the period during which the divided regions 22 are not scanned by the scanning light, the divided regions 22 are controlled into the clear transient state in the non-image state. During the projection period of image light, visibility of image is maintained, and see-through characteristics of the screen 21 are obtained.

Figure 17A:
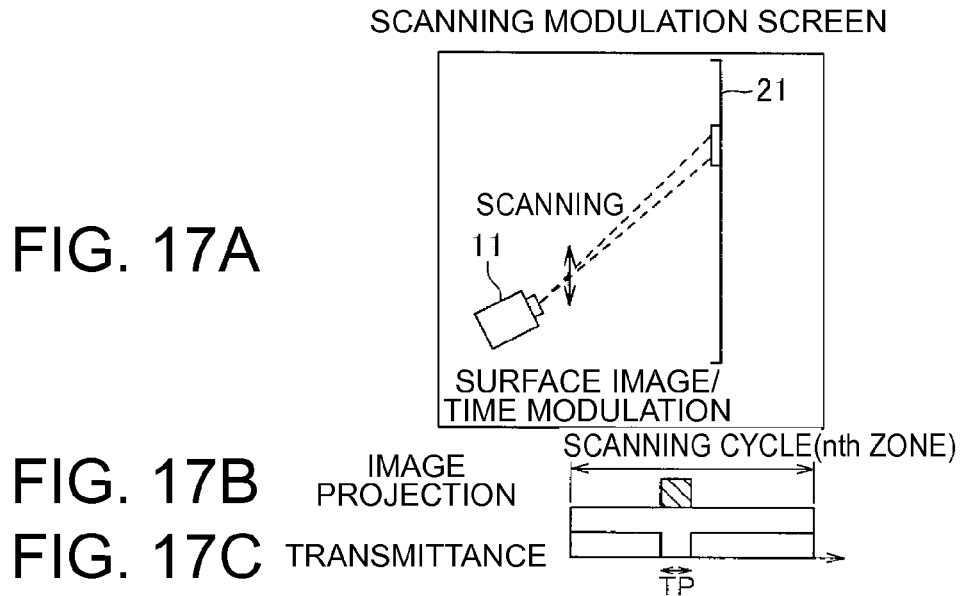

A projecting method of the projector 11 of Example 6 will be described with reference to FIGS. 17A to 17C. FIGS. 17A to 17C are explanatory diagrams of the projector 11 which scans the screen 21. FIG. 17A is an explanatory diagram of the projecting method in which the projector 11 scans the screen 21. In this case, image light is always projected onto the screen 21 during the scanning cycle. However, if attention is paid to each of portions of the screen 21, image light is projected during a portion of the scanning cycle as shown in FIG. 17B. Hence, as shown in FIG. 17C, it is only necessary that the portions of the screen are brought into the scattering state during a partial scanning period TP during which the portions of the screen are scanned. If the portions of the screen 21 are controlled such that the parallel light ray transmittance is increased in a period other than the partial scanning period TP, the see-through characteristics of the screen 21 can be obtained without lowering luminance of image.

When the screen 21 is divided into a reed shape in one direction as shown in FIG. 15, projection light of the projector 11 is sequentially scanned in the divided direction of the screen 21. The synchronous controller 31 controls the plurality of divided regions 22 from the clear transmission state into the scattering state in scanning order based on the synchronous signal from the projector 11 so that a portion irradiated with projection light of the projector 11 is maintained in the image state (scattering state in Example 6). By this synchronous control, the divided regions 22 of the screen 21 are brought into the scattering state as an image state in a period Ton (see FIG. 18) including an image period during which the regions are irradiated with projection light. In a non-image period Toff (see FIG. 18) during which projection light is not emitted, the state is brought into the clear transmission state as the non-image state.

Therefore, the screen 21 can have such clearness that an object existing on its back surface can be recognized, the screen 21 can scatter and penetrate image light with the same brightness as that when the scattering state is always maintained. That is, it is possible to realize both see-through characteristics allowing a user to recognize a background object and high visibility of image.

Figure 18:
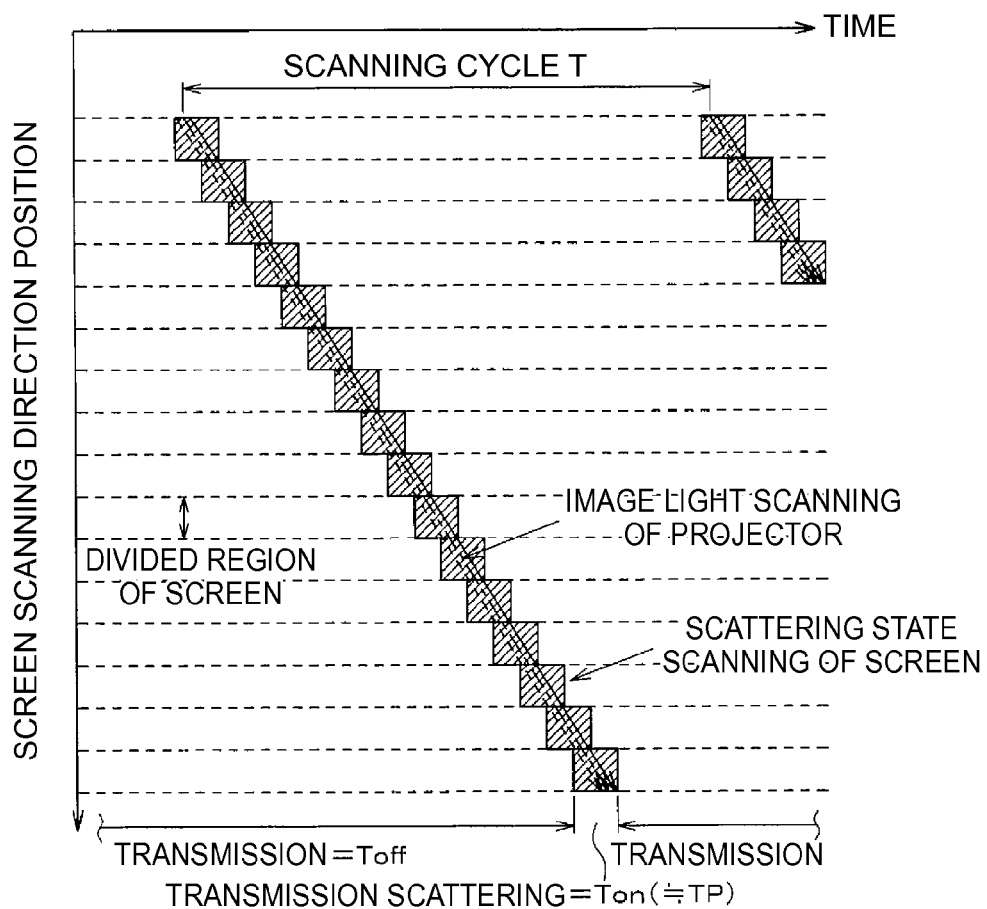
FIG. 18 is a schematic timing chart of the scanning and driving operations of the screen shown in FIG. 14.

FIG. 18 is a schematic timing chart of a scanning operation and a driving operation of the screen 21. A lateral axis shows time. A vertical axis shows positions in a vertical direction of the screen, and corresponds to the plurality of divided regions 22 of the screen 21.

The divided regions 22 of the screen 21 are controlled from the clear transmission state to the scattering state before image light starts scanning the regions. The divided regions 22 which are in the scattering state are controlled from the scattering state into the clear transmission state after the scanning operation of the regions is completed.

The plurality of divided regions 22 are controlled into the image stage (scattering state) in synchronization with the partial scanning period TP during which the regions are irradiated with image light by the scanning operation, and the divided regions 22 are sequentially switched into the image stage in the scanning order at different times. Image light which scans the screen 21 is efficiently scattered by a portion which is maintained in the image stage, and bright and high visibility can be obtained. In FIG. 18, image light scanning is indicated by three arrows, and the arrows show image light respectively corresponding to three primary colors, i.e., red, green and blue.

Information of switching timing for the synchronous control is sent from the projector 11 to the synchronous controller 31 as a synchronous signal like Example 1. Preferably, the synchronous controller 31 controls voltage applied to the opposite electrode 26 and the control electrode 27 so that projection light is emitted in a period during which an optical state of each of the divided regions 22 is stabilized in a predetermined scattering state. The optical state of the divided region 22 is switched by a signal waveform of voltage applied to the control electrode 27. Especially, information of switching timing which is output by the projector 11 to the synchronous controller 31 should include information of starting timing of the scanning operation of each frame of the projector 11, and scanning speed (delay/shift of scanning). According to this, even when frame frequency is changed, it is possible to realize excellent see-through display without disturbing image. The projector 11 and the synchronous controller 31 may communicate with each other in a wireless manner using microwave or electromagnetic wave such as infrared light, and information for realizing synchronization may be sent and received through a wireless signal.

According to this synchronous control, the synchronous controller 31 of Example 6 switches the optical states of the plurality of divided regions 22 in the scanning cycle T of image light in synchronization with scanning of image light by the projector 11 into an optical state of a portion of the screen 21 onto which image light is projected is brought into the image stage.

Hence, in a period Ton including timing at which image light is emitted, since a portion irradiated with image light is maintained in the scattering state, the screen 21 can display image.

Further, since the screen 21 is controlled such that its portions are in the clean transmission state during time other than the period Ton in the projection time of the image light, it is possible to see through the screen 21. It seems to human eyes that light penetrating the screen 21 is averaged (integrated). Therefore, in the case of sufficiently short scanning period, see-through characteristics can be obtained without making a user feel flicker.

Figure 19:
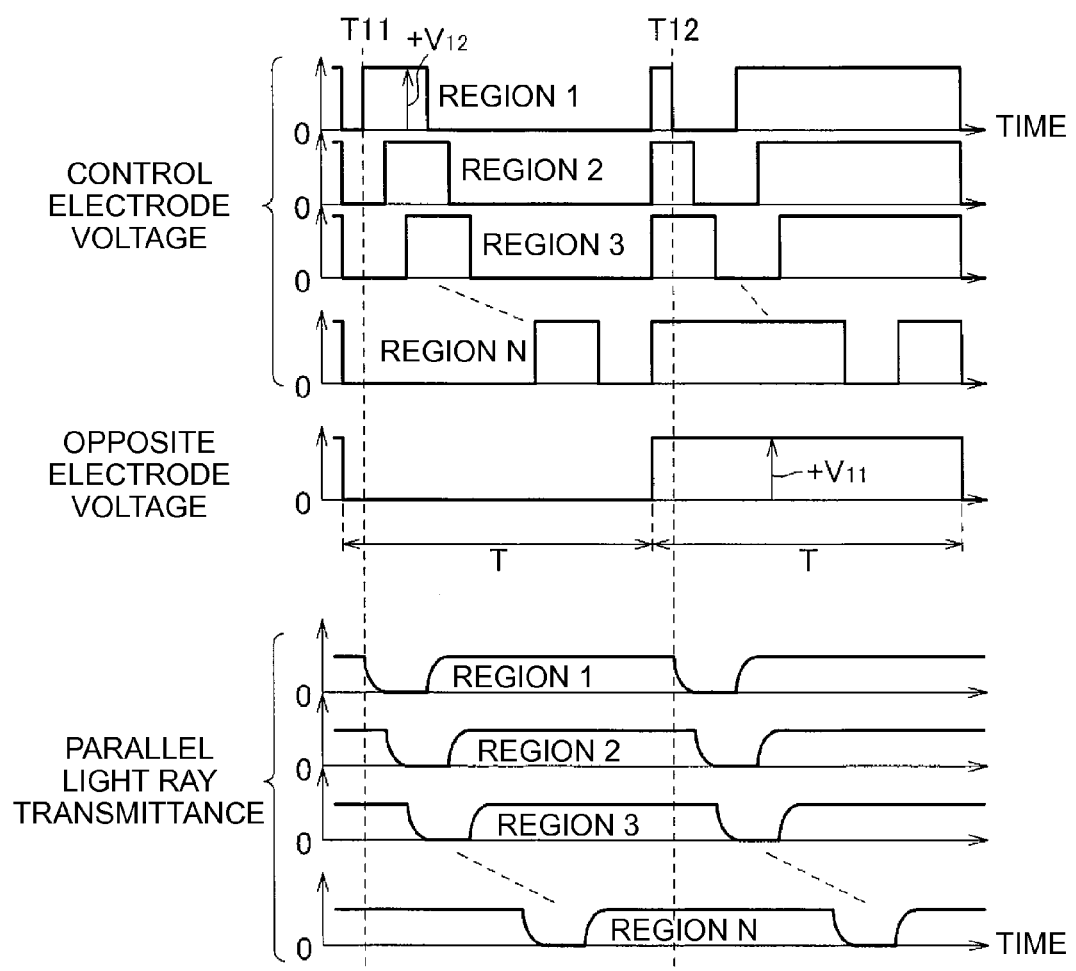
FIG. 19 is a timing chart showing a case where drive voltage waveform shown in FIG. 14 is applied to a plurality of regions.

Next, a driving operation of the display device 1 using the screen 21 which operates in the reverse mode will be described. FIG. 19 is a timing chart showing one example of a relation between an optical state and drive voltage waveform applied by the synchronous controller 31. The drive voltage waveform of Example 1 (FIG. 5) is applied to the example shown in FIG. 19, but drive voltage waveforms shown in Examples 2 to 5 may be applied.

As shown in FIG. 19, pulse voltages are sequentially and isochronally applied to regions from a scanning top region 1 to one another during cycle T, and the regions are changed from the transmission state to the scattering state. In FIG. 19, times partially overlap with each other between regions where applications of pulse voltages are adjacent to each other, but times may entirely overlap with each other (that is, a plurality of regions may change at the same time), or times may not overlap with each other. Application times of pulse voltages may not be the same times (isochronal) and may be different times (not isochronal). It is possible to change optical characteristics-maintaining time of the optical layer 25 by increasing or reducing the application time of pulse voltage.

That is, timings at which optical states of optical layers 25 corresponding to regions of the divided control electrode 27 are changed are sequentially switched and based on this switching, the application timings of the pulse voltages are sequentially switched.

According to Example 6, the control electrode 27 is divided into the plurality of regions in the reed shape, and the synchronous controller 31 sequentially switches the application timings of the pulse voltages such that timings at which optical states of the optical layers 25 corresponding to the regions of the divided control electrode 27 are changed are sequentially switched. Therefore, in the screen 21 in which the control electrode 27 is divided into a plurality of regions, a circuit configuration can be simplified, and power consumption can be reduced. By dividing the control electrode 27 into the reed shape, it is possible to vertically arrange the screen 21 along a scanning direction, and optical states can sequentially be changed in scanning order of image.

Example 7

Next, a display device according to Example 7 of the present invention will be described with reference to FIG. 20. The same reference signs are allocated to the same members as those of Examples 1 to 6, and description thereof will be omitted.

A configuration of the display device of Example 7 is the same as that of Example 6, but drive voltage waveforms applied to the opposite electrode 26 and the control electrode 27 are different. Example 7 will be described with reference to a timing chart which shows one example of drive voltage waveform of Example 7 shown in FIG. 20.

According to Example 7, in the screen 21 divided into a plurality of regions as shown in Example 6, to increase the optical characteristics-maintaining time of each of the regions, a length (voltage maintaining time) of pulse voltage is increased, and when the voltage maintaining time of pulse voltage overlaps with time during which a voltage value of rectangular wave voltage applied to the opposite electrode 26 and the control electrode 27 is changed, the voltage value is changed so that voltage waveform of the pulse voltage also maintains a potential difference which is necessary to maintain the optical state is changed.

Figure 20:
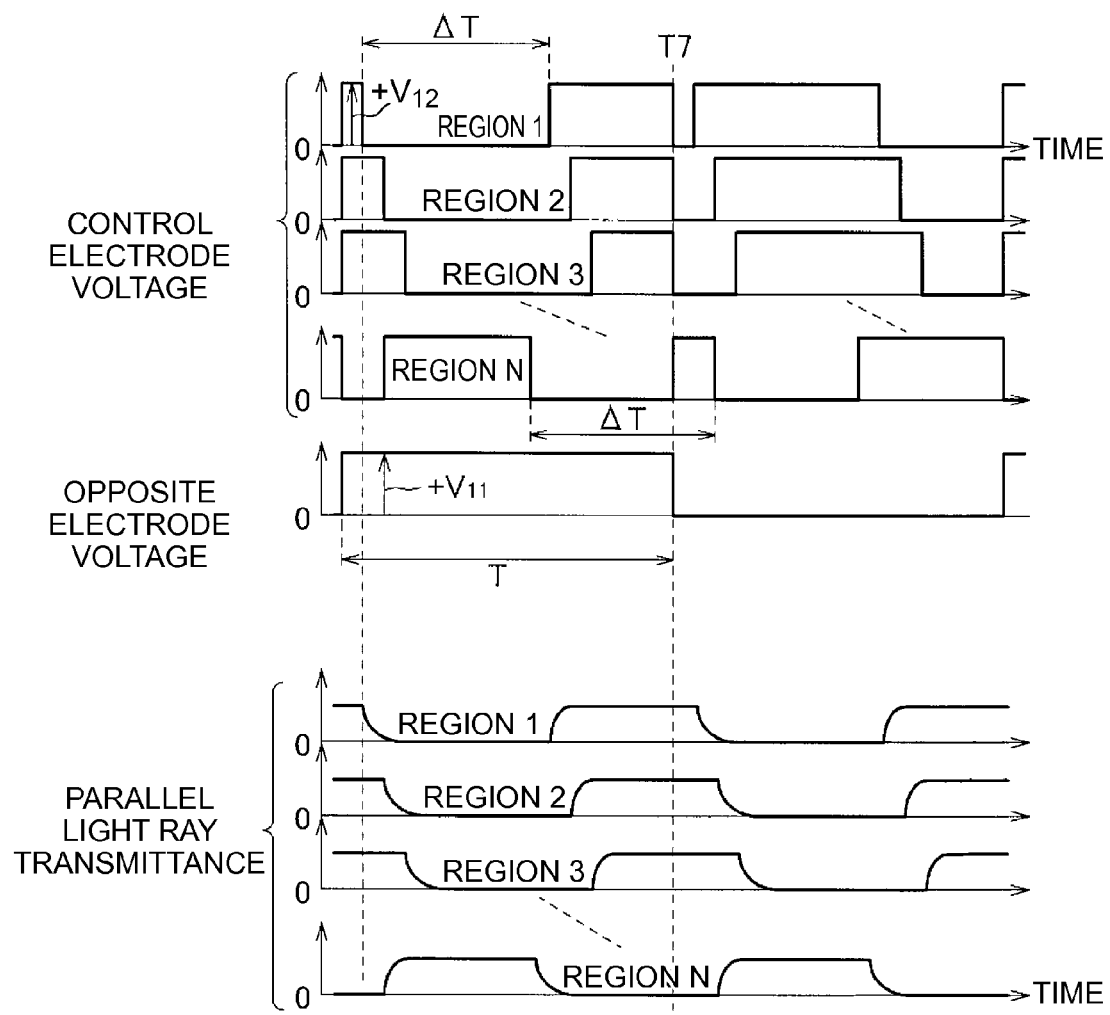
FIG. 20 is a timing chart showing driving voltage waveform when a screen of a display device according to Example 7 of the invention operates in a reverse mode.

In the case of FIG. 20, if the voltage maintaining time is defined as ΔT and changing time of voltage value of rectangular wave voltage is defined as T7, voltage maintaining time in a region N exceeds T7 (overlaps). Hence, of the voltage maintaining time in the region N, the voltage value is changed from 0 volt to +V12 volts after T7 so that a scattering state can be maintained. In such control, since the voltage maintaining time (optical characteristics-maintaining time) and cycle of the rectangular wave voltage are previously known, it is only necessary to predict which region time overlaps with time T7 for changing the voltage value, and to change the voltage value of that region when time reaches T7 (voltage value is changed to such voltage which is reversed concerning central value of control electrode 27).

Although Example 7 is described based on the drive voltage waveform shown in Example 1 as drive voltage waveform, drive voltage waveform shown in other Examples may also be used of course.

According to Example 7, of the plurality of control electrodes 27, if there exists an electrode of which voltage maintaining time of pulse voltage overlaps with voltage value-changing timing of rectangular wave voltage, control is performed such that the voltage value of the pulse voltage applied to the control electrode is changed with voltage value-changing timing of the rectangular wave voltage. Therefore, of a plurality of regions, a region of which voltage maintaining time overlaps with the voltage value-changing timing of the rectangular wave voltage can also maintain the optical characteristics by the set time, and it is possible to avoid deterioration in display such as display unevenness which is caused because optical characteristics-maintaining time is different depending upon a region.

In the above-described Examples, amplitude of pulse voltage is the same as or smaller than the rectangular wave voltage value applied to the opposite electrode 26, but the amplitude may be greater than the rectangular wave voltage value. According to this, even if the amplitude of the rectangular wave voltage applied to the opposite electrode 26 is made small, it is possible to change the optical state of the optical layer 25.

According to the above-described Examples, the following display device 1 and the drive method for the display device 1 can be obtained.

(Additional State 1)

A display device 1 comprising:

a screen 21 including an optical layer 25 of which optical state is changed if voltage is applied to the optical layer 25, and an opposite electrode 26 and a control electrode 27 which are opposed to each other to sandwich the optical layer 25 therebetween for applying voltage to the optical layer 25; and a synchronous controller 31 which applies predetermined voltage to the opposite electrode 26 and the control electrode 27 during a projection period of image light projected onto the screen 21 and which outputs a switching signal for switching the screen 21 between a scattering state for scattering image light and a transmission state which is a different optical state from the scattering state, wherein the synchronous controller 31 applies, to the opposite electrode 26, first rectangular wave voltage having cycle which is an integral multiple of cycle during which the optical state of the optical layer 25 is changed, and applies, to the control electrode 27, pulse voltage which becomes a potential difference between the electrodes of which optical state is changed when the optical state of the optical layer 25 is changed in a superimposed manner on second rectangular wave voltage having the same cycle as that of the first rectangular wave voltage and having the same phase as or a phase half-deviated from the first rectangular wave voltage.

(Additional State 2)

A drive method for a display device 1 comprising:

a screen 21 including an optical layer 25 of which optical state is changed if voltage is applied to the optical layer 25, and an opposite electrode 26 and a control electrode 27 which are opposed to each other to sandwich the optical layer 25 therebetween for applying voltage to the optical layer 25; and a synchronous controller 31 which applies predetermined voltage to the opposite electrode 26 and the control electrode 27 during a projection period of image light projected onto the screen 21 and which outputs a switching signal for switching the screen 21 between a scattering state for scattering image light and a transmission state which is a different optical state from the scattering state, wherein the synchronous controller 31 applies, to the opposite electrode 26, first rectangular wave voltage having cycle which is an integral multiple of cycle during which the optical state of the optical layer 25 is changed, and applies, to the control electrode 27, pulse voltage which becomes a potential difference between the electrodes of which optical state is changed when the optical state of the optical layer 25 is changed in a superimposed manner on second rectangular wave voltage having the same cycle as that of the first rectangular wave voltage and having the same phase as or a phase half-deviated from the first rectangular wave voltage.

According to the display device 1 and the drive method for the display device, if amplitudes of the first and second rectangular wave voltages and the pulse voltage are set to a potential difference between electrodes by which the optical state is changed, it is possible to configure a circuit which is driven with a small power source and thus, a circuit configuration can be simplified. Further, since voltage can be lowered, power consumption can be reduced. It is possible to easily change optical characteristics of a device which configures an optical layer at arbitrary timing.

The above-described Examples only show a typical embodiment of the present invention, and the invention is not limited to the Examples. That is, the invention can variously be modified and carried out within a range not departing from the subject matter of the invention.

REFERENCE SIGNS LIST

1 display device
11 projector
21 screen
25 optical layer
26 opposite electrode (first electrode)
27 control electrode (second electrode)
31 synchronous controller (controller)

The invention claimed is:

1. A display device comprising:
   a screen including an optical layer of which optical state is changed if voltage is applied to the optical layer, and a first electrode and a second electrode which are opposed to each other to sandwich the optical layer therebetween for applying voltage to the optical layer; and
   a controller which applies predetermined voltage to the first electrode and the second electrode during a projection period of image light projected onto the screen and which switches the screen between a predetermined image state for scattering the image light and a non-image state which is a different optical state from the image state, wherein
   the controller applies, to the first electrode, first rectangular wave voltage having cycle which is an integral multiple of cycle during which the optical state of the optical layer is changed, and applies, to the second electrode, second rectangular wave voltage having the same cycle as that of the first rectangular wave voltage and having the same phase as or a phase-half-deviated from the first rectangular wave voltage and pulse voltage which becomes a potential difference between the electrodes of which the optical state is changed when the optical state of the optical layer is changed in a superimposed manner.

2. The display device according to claim 1, wherein
   the first rectangular wave voltage applied to the first electrode and the second rectangular wave voltage applied to the second electrode are composed of voltages showing positive or negative voltage and 0 volt, and
   amplitude of the second rectangular wave voltage applied to the second electrode is the same as or smaller than that of the first rectangular wave voltage.

3. The display device according to claim 1, wherein
   the first rectangular wave voltage applied to the first electrode and the second rectangular wave voltage applied to the second electrode are bipolar AC voltages, and
   amplitude of the second rectangular wave voltage applied to the second electrode is the same as or smaller than that of the first rectangular wave voltage.

4. The display device according to claim 1, wherein
   the first rectangular wave voltage applied to the first electrode is biased AC voltage, the second rectangular wave voltage applied to the second electrode is composed of voltages showing positive or negative voltage and 0 volt, and
   amplitude of the second rectangular wave voltage applied to the second electrode is smaller than that of the first rectangular wave voltage and a central value of the amplitude is the same as that of the first rectangular wave voltage.

5. The display device according to claim 1, wherein the pulse voltage is the same as at least one of the two voltage values configuring the second rectangular wave voltage.

6. The display device according to claim 1, wherein the pulse voltage is the same as at least one of two voltage values configuring the first rectangular wave voltage.

7. The display device according to claim 1, wherein amplitude of the pulse voltage is smaller than that of the first rectangular wave voltage.

8. The display device according to claim 1, wherein the pulse voltage is composed of a plurality of voltage values in a half cycle of the second rectangular wave voltage.

9. The display device according to claim 1, wherein cycle of the first rectangular wave voltage is an even multiple of cycle during which the optical state of the optical layer is changed.

10. The display device according to claim 1, wherein the first rectangular wave voltage and the second rectangular wave voltage are voltages in which device characteristics of a device configuring the optical layer are not changed by a potential difference generated by the two rectangular wave voltages.

11. The display device according to claim 1, wherein
    the second electrode is divided into a plurality of regions, and
    the controller sequentially switches application timings of the pulse voltage such that timings for changing the optical states of the optical layers corresponding to the regions of the divided second electrode are sequentially switched.

12. The display device according to claim 11, wherein the second electrode is divided into a reed shape.

13. The display device according to claim 11, wherein the controller controls application times of the pulse voltage applied to the second electrode which is divided into the plurality of regions such that the application times overlap with each other in adjacent two of the regions.

14. The display device according to claim 11, wherein the controller changes optical characteristics-maintaining time of the optical layer by increasing or reducing application time of the pulse voltage applied to the second electrode.

15. The display device according to claim 11, wherein when the controller detects one or some of the plurality of second electrodes in which optical characteristics-maintaining time of the optical layer overlaps with voltage value-changing timing of the first rectangular wave voltage, the controller changes the pulse voltage applied to the second electrode to a voltage value which is inverted concerning a central value of the second rectangular wave voltage at the voltage value-changing timing.

16. A drive method for a display device comprising:
- a screen including an optical layer of which optical state is changed if voltage is applied to the optical layer, and a first electrode and a second electrode which are opposed to each other to sandwich the optical layer therebetween for applying voltage to the optical layer; and
- a controller which applies predetermined voltage to the first electrode and the second electrode during a projection period of image light projected onto the screen and which switches the screen between a predetermined image state for scattering the image light and a non-image state which is a different optical state from the image state, wherein the controller applies, to the first electrode, first rectangular wave voltage having cycle which is an integral multiple of cycle during which the optical state of the optical layer is changed, and applies, to the second electrode, second rectangular wave voltage having the same cycle as that of the first rectangular wave voltage and having the same phase as or a phase half-deviated from the first rectangular wave voltage and pulse voltage which becomes a potential difference between the electrodes of which the optical state is changed when the optical state of the optical layer is changed in a superimposed manner.

* * * * *